United States Patent [19]
Harimoto et al.

[11] Patent Number: 5,324,119
[45] Date of Patent: Jun. 28, 1994

[54] NEEDLE ROLLER BEARING

[75] Inventors: Kazuyoshi Harimoto, Iwata; Atsushi Yamashita, Fukuroi, both of Japan

[73] Assignee: NTN Corporation, Osaka, Japan

[21] Appl. No.: 110,727

[22] Filed: Aug. 23, 1993

[30] Foreign Application Priority Data

Mar. 29, 1993 [JP] Japan .................................. 5-095530

[51] Int. Cl.⁵ ...................... F16C 19/26; F16C 33/46; F16C 33/58; F16H 25/18
[52] U.S. Cl. ...................................... 384/548; 74/107; 384/569; 384/572
[58] Field of Search ............... 384/548, 559, 560, 569, 384/572, 575, 576, 577, 580; 74/107; 188/72.7

[56] References Cited

U.S. PATENT DOCUMENTS

| | | |
|---|---|---|
| 3,316,037 | 4/1967 | Schaeffler . |
| 3,435,691 | 4/1969 | Cook et al. ............................ 74/107 |
| 3,507,546 | 4/1970 | Haslimann et al. .................. 384/569 |
| 4,184,571 | 1/1980 | Karasudani ...................... 74/107 X |

FOREIGN PATENT DOCUMENTS

| | | | |
|---|---|---|---|
| 117707 | 5/1989 | Japan . | |
| 5-87147 | 4/1993 | Japan | .................................. 384/548 |
| 1173087 | 12/1969 | United Kingdom | ................ 384/572 |

*Primary Examiner*—Thomas R. Hannon

[57] ABSTRACT

A needle roller bearing is directed to avoid a possibility that an inner peripheral surface of a bore in a housing may be ground or scraped by an edge defining a peripheral lip region of an opening in an outer race when a needle roller bearing is to be press-fitted into the bore in the housing and also to eliminate the need to adjust the position of a roller retainer while increasing a physical strength of the roller retainer. For this purpose, the outer race is formed with a first opening having a pair of axially spaced tabs bent so as to incline radially inwardly of the outer race from the remaining portion of the outer race. The roller retainer is in the form of a tubular member having a circumferentially continuous wall formed with a second opening at a location aligned with the first opening in the outer race. The roller retainer has a substantially intermediate portion protruding radially outwardly so as to have an outer diameter greater than that of any one of the opposite ends of the roller retainer.

11 Claims, 10 Drawing Sheets

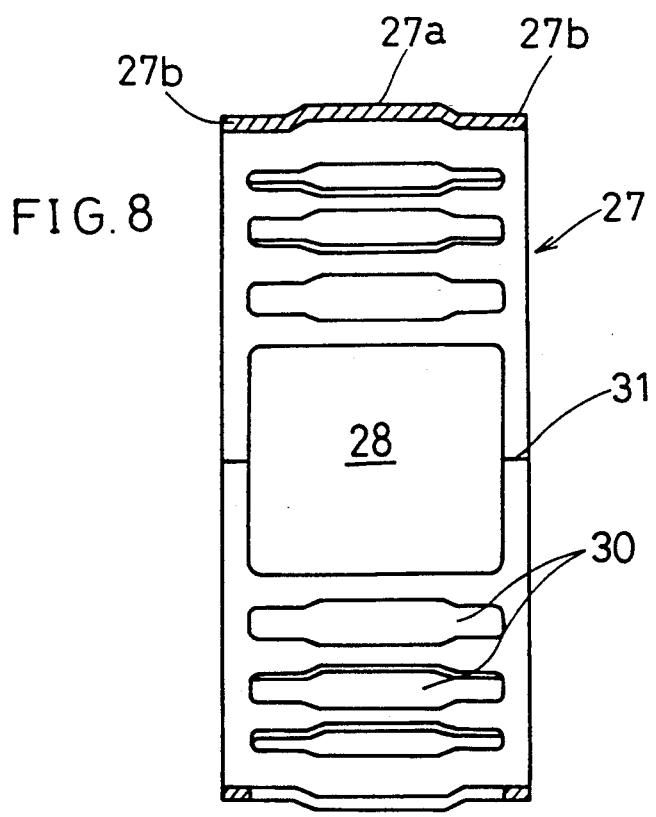
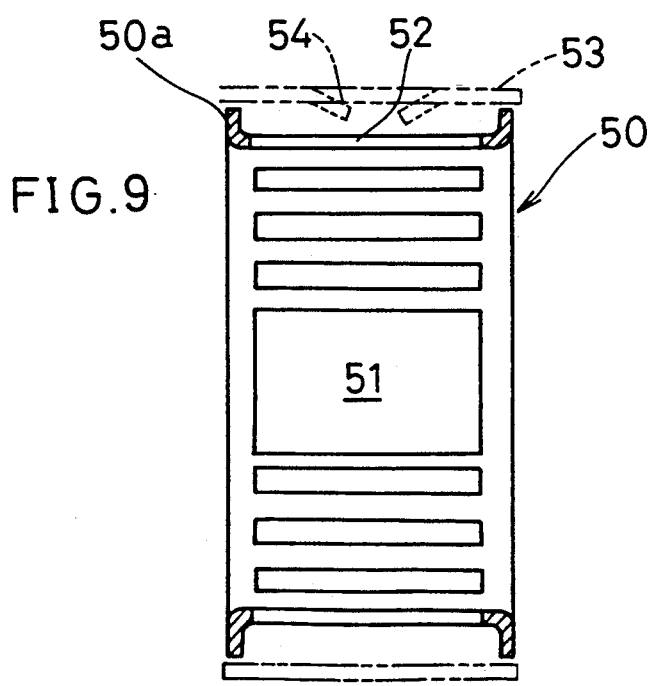

NEEDLE ROLLER BEARING

BACKGROUND OF THE INVENTION

1. Field of the Invention

The present invention relates to a needle roller bearing comprising an outer race having an opening defined in a peripheral wall of the outer race.

2. Description of Background Art

It is well known that some of needle roller bearings include an outer race formed with an opening for feeding a lubricant oil to internal component parts of the needle roller bearing and/or for mounting an engagement member for engagement with a shaft, such as disclosed in U.S. Pat. No. 3,316,037 and Japanese Examined Utility Model Publication No. 1-17707. By way of example, in a needle roller bearing designed for installation in a disc brake assembly, the outer race has such an opening for mounting the engagement member on/at the shaft through the needle roller bearing.

An example of prior art needle roller bearing is shown in FIG. 17. The illustrated prior art needle roller bearing includes an opening defined in the outer race and is generally utilized in association with a disc brake assembly. The outer race 1 is in the form of a shell of thin steel plate which has been deep drawn and includes a roller retainer 3 positioned inside the outer race 1 and carrying a plurality of needle rollers 2. The needle rollers 2 used therein are brought into rolling contact with an outer peripheral surface of a shaft 7 with no inner race employed between the roller retainer 3 and the shaft 7. As shown therein, the outer race 1 has the opening identified by 6 and defined therein in alignment with a through-hole 5 in the housing 4.

FIG. 18 illustrates a transverse sectional view of the prior art needle roller bearing shown in FIG. 17, the roller retainer 3 is in the form of a split ring having a split area 3a defined at a location aligned with the opening 6 in the outer race 1. An engagement member (not shown) engageable with the shaft 7 is inserted through the through-hole 5, then through the opening 6 and finally through the split area 3a.

The shell-like outer race 1 of the structure described above is press-fitted into the bore in the housing 4. However, since the outer race 1 is formed with the opening 6, and when the needle roller bearing is to be inserted under interference fit into the bore in the housing, for example, in a direction shown by the arrow Z in FIG. 17, a sharp edge 6af bar positioned on a peripheral lip region of the opening 6 in the outer race 1 at a location on a trailing side with respect to the direction Z of insertion of the outer race 1 tends to grind or scrape the inner peripheral surface of the bore in the housing 4 with resultant scrapes falling into the bearing. Once this occurs, a detrimental damage may occur in the system. Also, the edge 6af positioned on the peripheral lip region of the opening 6 at a location on a leading side with respect to the direction Z of insertion may often grind or scrape the inner peripheral surface of the housing 4 since one or more burrs are often formed on the edge 6af during the formation of the opening 6.

While the outer race 1 is made of steel plate, the housing 4 is generally made of aluminum for the purpose of reducing the weight of, for example, the disc brake assembly as a whole or made of iron which has not been heat-treated. Therefore, due to a difference in hardness between the outer race 1 and the housing 4, the above discussed problem associated with the grinding is very likely to occur. Also, while the opening 6 in the outer race 1 is generally formed by the use of a blanking technique, the presence of fins left at the peripheral lip region of the opening 6 highlights the above discussed problem of grinding.

Also, in the needle roller bearing wherein the roller retainer 3 has the split area 3a for the passage of the engagement member, it is necessary for the opening 6 in the outer race 1 to be aligned with the split area 3a with respect to the circumferential direction. However, since the roller retainer 3 is free to rotate inside the outer race 1, an accurate positioning of the split area 3a in the roller retainer 3 relative to the opening 6 in the outer race 1 is not easy to achieve during the assemblage and mounting of the needle roller bearing. Because of this, the adjustment in position of the roller retainer 3 relative to the outer race is generally carried out when the engagement member is inserted through the opening 6 in the outer race 1, and this positioning procedure is complicated and time-consuming because a space available for the adjustment to be done therein is extremely limited.

In addition to the foregoing problems, the use of the roller retainer 3 having the split area 3a brings about a problem in that, as compared with the roller retainer in the form of a hollow cylindrical member, the physical strength and the durability thereof tend to be reduced.

In an attempt to alleviate the foregoing problems, it has been suggested that, as shown by the double-dotted lines in FIGS. 17 and 18, the peripheral lip region 6b of the opening in the outer race 1 is bent to depress radially inwardly of the outer race 1. The use of the radially inwardly depressed peripheral lip region 6b does not only eliminate substantially the problem of grinding, but also the positioning procedure can be dispensed with since the depressed peripheral lip region 6b serves as a stop with which the split area 3a of the roller retainer is engaged. However, this suggestion still has a problem in that, since the roller retainer is in the form of the split ring having the split area as is the case with the roller retainer shown in FIGS. 17 and 18, the physical strength and the durability of the roller retainer are still remote from the requirement.

SUMMARY OF THE INVENTION

To this end, the present invention provides a needle roller bearing adapted to be interposed between a housing and a shaft member rotatable relative to the housing. This needle roller bearing includes an outer race adapted to be inserted axially in a bore defined in the housing and having an opening defined in a peripheral wall thereof, a plurality of needle rollers juxtaposed circumferentially and inside the outer race and held in rolling contact with an inner peripheral surface of the outer race, and a roller retainer having pockets defined therein for accommodating therein the respective needle rollers. In the outer race, at least one of portions of a peripheral lip region of the opening in the outer race, which portions are oppositely spaced from each other in a direction parallel to the longitudinal sense of the outer race, is formed with a tab which is offset radially inwardly from the remaining peripheral wall of the outer race thereby to restrict the position of the roller retainer with respect to the direction of angular movement thereof inside the outer race in a direction circumferentially of the outer race by interference with the peripheral lip region of the opening in the roller retainer.

According to the present invention, since the tab defined the peripheral lip region of the opening in the outer race is offset radially inwardly relative to the remaining wall of the outer race, insertion of the outer race into the bore in the housing does not result in a contact of an edge of the tab with the inner peripheral surface of the bore in the housing, and therefore, any possible grinding of the inner peripheral surface of the bore does not occur.

Also, circumferentially opposite edge portions forming parts of the peripheral lip region of the opening in the roller retainer are brought into contact with the tab in the outer race so as to restrict the angular movement of the roller retainer inside the outer race in a direction circumferentially of the outer race. Because of this, no complicated and time-consuming positioning of the roller retainer can advantageously be dispensed with, which would otherwise be required when the needle roller bearing is installed in an equipment such as a disc brake assembly.

Also, since the roller retainer is in the form of a tubular member having a circumferentially continuous wall and having the opening defined in the circumferentially continuous wall of the roller retainer in alignment with the opening in the outer race in place of a longitudinal split hitherto employed in the roller retainer in the prior art needle roller bearing, the needle roller bearing embodying the present invention has a physical strength and a durability both superior to those of the prior art needle roller bearing.

According to a preferred embodiment of the present invention, the roller retainer has a substantially intermediate portion having an outer diameter greater than the outer diameter of any one of the opposite ends thereof. The axially opposite ends of the roller retainer has inner peripheral surfaces thereof held in close proximity of a shaft side member comprised of the shaft or an inner race fixedly mounted on the shaft, thereby to form guided faces adapted to be guided by the shaft side member. Alternatively, the intermediate portion of the roller retainer may have an outer peripheral surface held in close proximity to the outer race thereby to form a guided face adapted to be guided by the outer race.

According to this structure, since the intermediate portion of the roller retainer is designed to have a large diameter, even though the amount of offset of the tab in the outer race with respect to the radially inward direction is small, the tab of the outer race can be brought into engagement with circumferentially opposite portions of the peripheral lip regions of the opening in the roller retainer, thereby restricting the angular movement of the roller retainer inside the outer race. Accordingly, the necessity of accurately positioning the roller retainer which has hitherto been required in installing the needle roller bearing in the equipment requiring the use of any bearing can be advantageously dispensed with.

In addition, with the structure of the needle roller bearing according to the present invention, the roller retainer can readily and easily be inserted into the outer race. In other words, if the roller retainer is in the form of a tubular member having a circumferentially continuous wall and is of a so-called 'outer race guide design' wherein the axially opposite ends of the roller retainer are held in close proximity to the inner peripheral surface of the outer race, the roller retainer is unable to be deformed radially inwardly to allow it to fit into a bore of the outer race during the insertion of the roller retainer into the outer race due to the peculiar one-piece construction. For this reason, the opposite ends of the roller retainer will interfere with the radially inwardly depressed tab in the outer race, making it difficult to insert the roller retainer into the outer race.

In contrast thereto, according to a so-called 'inner race guide design', such as employed in the present invention, wherein the opposite ends of the roller retainer are held in close proximity to the shaft member, the opposite ends of the roller retainer are spaced a considerable distance from the inner surface of the outer race and, hence, the roller retainer can readily and easily be inserted into the outer race with no possibility of the opposite ends of the roller retainer interfering with the tab in the outer race.

It is to be noted that, even though the outer diameter of the intermediate portion of the roller retainer is of a large value enough to approach the inner surface of the outer race, retention of the needle rollers within the associated pockets defined in the roller retainer can be accomplished by means of a transit area defined in the roller retainer between the intermediate portion of the large diameter and any one of the opposite ends of relatively small diameter of the outer retainer.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 8 is a longitudinal sectional view showing the roller retainer employed in the needle roller bearing;

FIG. 9 is a longitudinal sectional view of a comparative example of the roller retainer;

DETAILED DESCRIPTION OF THE EMBODIMENTS

Figure 1:
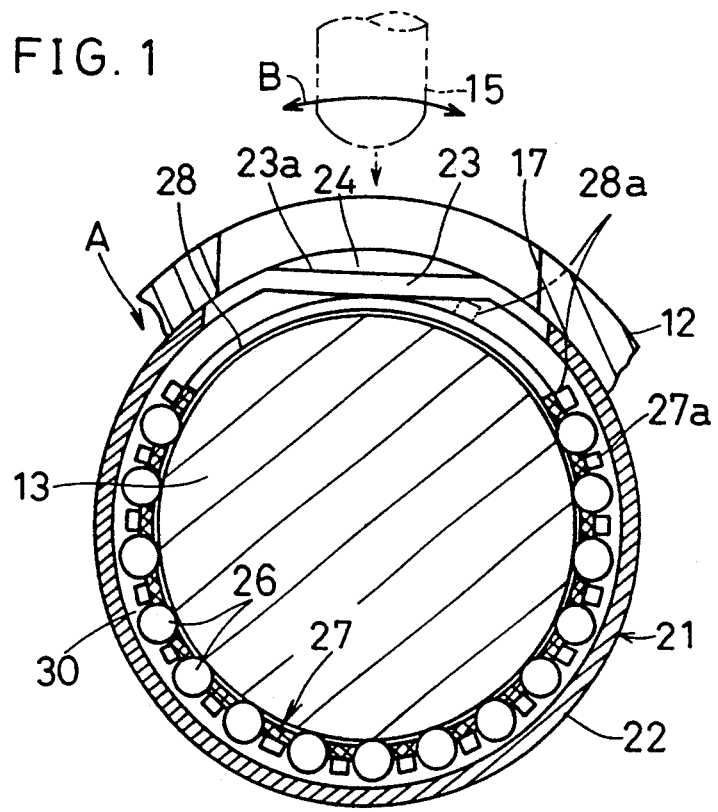
FIG. 1 is a transverse sectional view showing a needle roller bearing according to a first preferred embodiment of the present invention.

Referring first to FIG. 1, a needle roller bearing A according to a first preferred embodiment of the present invention includes an outer race 21 and a plurality of needle rollers 26 positioned radially inwardly of the outer race 21 and spaced circumferentially of the outer race 21. The needle roller bearing shown therein is of a type which employs no inner race and, therefore, the needle rollers 26 are interposed between an inner peripheral surface of the outer race 21 and an outer peripheral surface of, for example, a shaft 13 for rolling motion about their longitudinal axes.

Figure 3A:
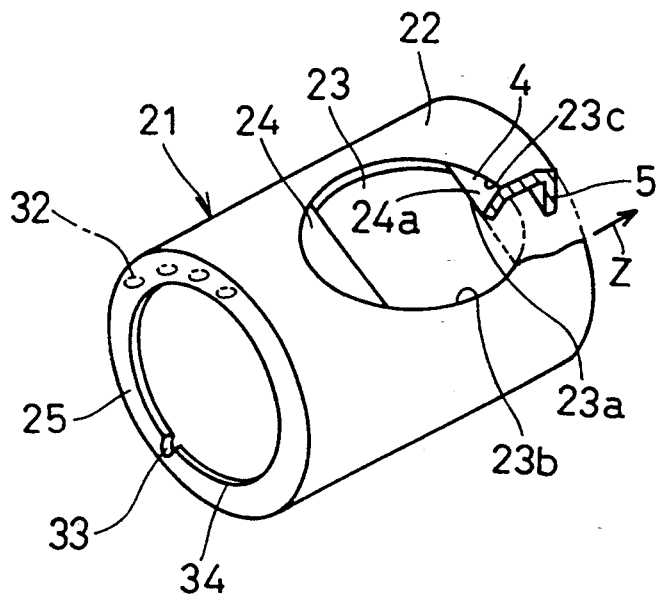
FIG. 3A is a perspective view, with a portion cut away, of an outer race employed in the needle roller bearing shown in FIG. 1.

As shown in FIG. 3A, the outer race 21 of the needle roller bearing A is in the form of a tubular shell of steel and includes a tubular wall 22. The outer race 21 has a first opening 23 defined in the tubular wall 22 at a portion thereof intermediate or generally intermediate of the length thereof. Circumferentially spaced peripheral lip regions or tabs 24 of the first opening 23, which confront with each other in a direction axially of the tubular wall 22, or which are positioned on leading and trailing sides with respect to the direction Z of insertion of the outer race 21 into the bore 19, are bent radially inwardly of the tubular wall 22 so as to incline downwardly with radially outer surface areas 24a thereof positioned radially inwardly of the outer peripheral surface of the tubular wall 22.

Each of the circumferentially spaced peripheral lip regions 24 of the first opening 23 is of a generally crescent shape and is continued to the tubular wall 22. More specifically, the first opening 23 is of a generally round shape defined by axially spaced chord edges 23a lying axially of the tubular wall 22 while the arcuate edges 23b lie transverse of the longitudinal sense of the tubular wall 22. Each of the axially spaced, generally crescent-shaped peripheral tabs 24 of the first opening is therefore delimited by the associated chord edge 23a and a corresponding arcuate bent line 23c about which the peripheral tab 24 has been bent radially inwardly of the tubular wall 22.

The outer race 21 has its opposite ends formed integrally with respective collars 25 integrally formed with the tubular wall 22 so as to extend radially inwardly from opposite ends of the tubular wall 22. At least one of the collars 25 has one or more indentations 32, descriptive of the model number, and at least one positioning notch 33.

Figure 7:
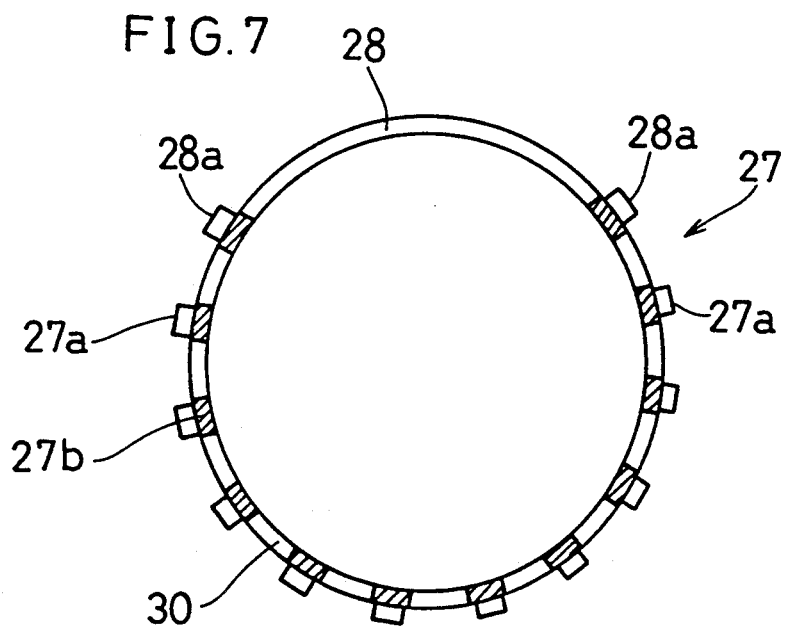
FIG. 7 is a transverse sectional view, on an enlarged scale, of a roller retainer employed in the needle roller bearing.

The needle rollers 26 are retained in position by means of a roller retainer 27 of a structure best shown in FIGS. 7 and 8. As shown in FIG. 7, the retainer 27 is of a non-split tubular structure having a second opening 28 defined therein at a location which, when the roller retainer 27 is mounted in position inside the complete needle roller bearing A, aligns with the first opening 23 in the tubular wall 22 of the outer race 21.

As shown in FIG. 8, the roller retainer 27 has an axially intermediate portion 27a radially outwardly protruding so as to have a diameter greater than that of any one of the opposite ends 27b of the roller retainer 27. In addition to the second opening 28 referred to above, this roller retainer 27 has generally elongated pockets 30 equal in number to the number of the needle rollers 26 and defined therein for loosely accommodating therein the respective needle rollers 26. Each of the elongated pockets 30 is so shaped and so configured as to extend across the radially outwardly protruding intermediate portion 27a with its opposite ends terminating spaced a distance axially inwardly from the respective opposite ends 27b of the roller retainer 27.

Figure 2:
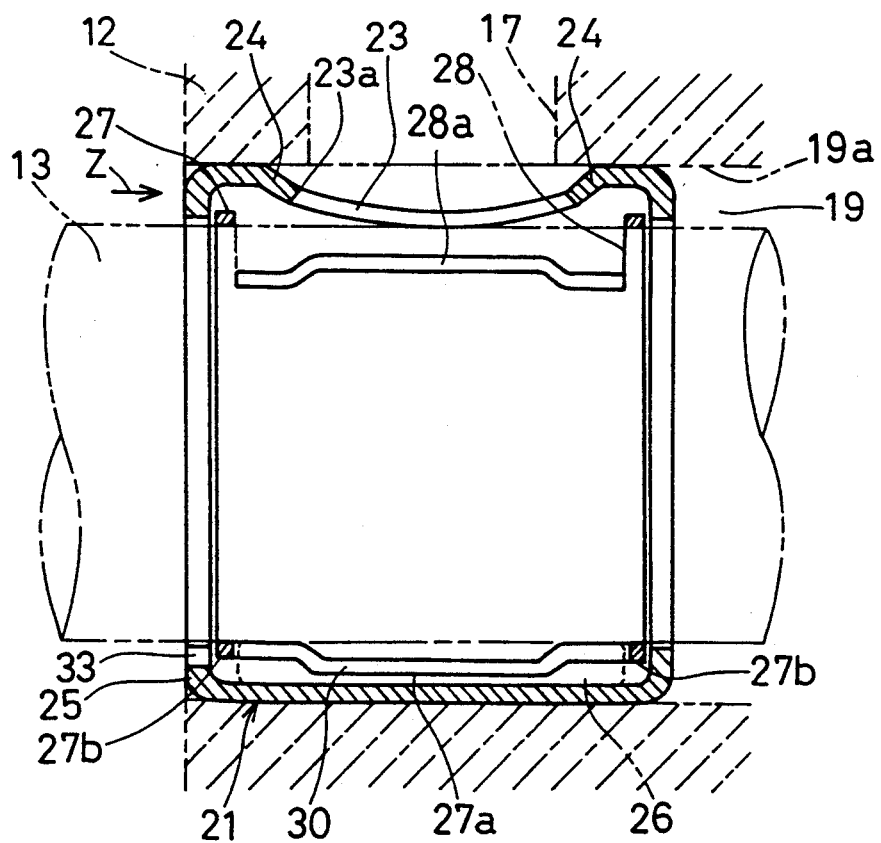
FIG. 2 is a longitudinal sectional view of the needle roller bearing shown in FIG. 1.

Referring to FIG. 2, inner peripheral surfaces of the opposite ends 27b of the roller retainer 27, which are radially inwardly undersized relative to the radially outwardly protruding intermediate portion 27a thereof are, when the roller retainer 27 is mounted around the shaft 13 as shown therein, held in close proximity to the outer peripheral surface of the shaft 13 so as to be guided by the latter and do therefore form guided faces, thereby forming a so-called 'inner diameter guide system'. The radially outwardly protruding intermediate portion 27a of the roller retainer 27 therefore serves to regulate the position of the needle roller 26 with respect to a circumferential direction thereof.

As best shown in FIG. 8, each of the pockets 30 defined in the roller retainer 27 is of a shape having an axially intermediate portion greater in width than that of each of the opposite ends thereof, whereas the second opening 28 is of a generally rectangular shape oversized relative to the first opening 23 in the outer race 21. The roller retainer 27 is preferably made by shaping a generally rectangular steel plate by the use of any known press work so as to represent a generally trapezoidal section and blanking the rectangular steel plate to form what corresponds to the second opening 28 and the pockets 30, then rounding the rectangular steel plate so as to represent a generally tubular shape and finally welding opposite ends of the rectangular steel plate to form a joint 31 that is positioned so as to axially traverse the second opening 28.

Figure 4:
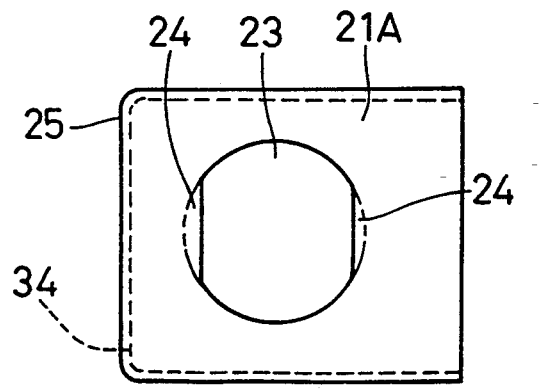
FIG. 4 is a side view of a tubular member which eventually forms the outer race of the needle roller bearing shown in FIG. 1.
Figure 5:
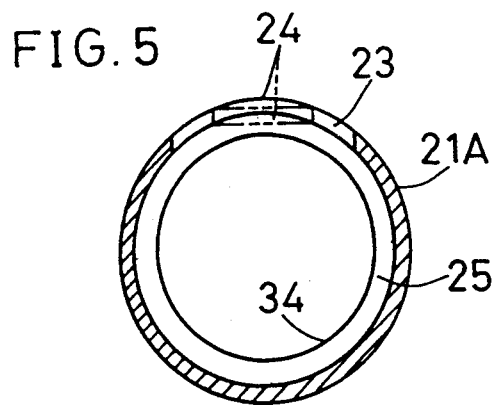
FIG. 5 is a transverse sectional view of the tubular member shown in FIG. 4.
Figure 6:
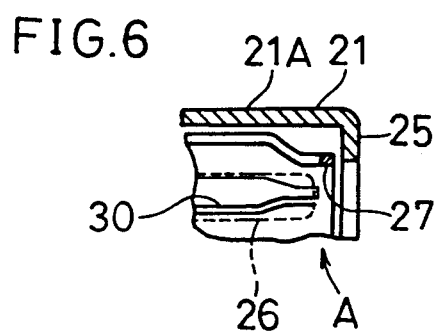
FIG. 6 is a fragmentary longitudinal sectional view of a portion of the complete needle roller bearing.

FIGS. 4 to 6 illustrate the sequence of manufacturing the outer race 21. Reference numeral 21A represents a blind tubular member, open at one end and closed at the other end, which has been formed by deep drawing a thin-walled steel plate. The closed end of the blind tubular member 21A is subsequently perforated, as shown in FIG. 5, to form a round hole 34 of a diameter smaller than the inner peripheral surface of the eventually completed outer race 21 so as to leave the collar 25. Then, the first opening 23 is formed by the use of any known blanking technique, followed by a press work using a die and a punch to radially inwardly depress the axially opposite tabs 24 as shown by the double-dotted chain line in FIG. 5.

Thereafter, as shown in FIG. 6, the roller retainer 27 is axially inwardly inserted into the tubular member 21A, followed by squeezing the open end of the tubular member 21A radially inwardly by the use of a press work to form the opposite collar 25, thereby completing the outer race 21. The needle roller bearing A is completed when the needle rollers 26 are subsequently pressed from interior of the outer race 21 to fit into the associated pockets 30 in the roller retainer 27 then accommodated inside the outer race 21.

The mounting of the completed needle roller bearing A is carried out by, as shown in FIG. 2, press-fitting the outer race 21, with both of the roller retainer 27 and the needle rollers 26 positioned inside the outer race 21, into a bore 19 defined in a housing 12 in the direction Z to fix it inside the bore 19 under interference fit with the first opening 23 in the outer race 21 aligned with a through-hole 17 in the housing 12. In such case, since the notch 33 is formed in one of the axially opposite collars 25 which is formed with the indentations 32 (FIG. 3A), positioning of the needle roller bearing A inside the housing 12 with respect to the circumferential direction of the bore 19 can readily and smoothly be accomplished by aligning the notch 33 with a positioning marking (not shown) provided in the housing 12.

During the press-fitting described above, the axially opposite chord edges 23a of the first opening 23 do not contact the circumferential surface 19a of the bore 19 since the axially opposite tabs 24 of the first opening 23 in the outer race 21 are radially inwardly depressed as hereinbefore described. Hence, there is no possibility that the axially opposite chord edges 23a of the first opening 23 in the outer race 21 will scrape or grind the circumferential surface 19a of the bore 19 during the insertion of the outer race 21 and, hence, the needle roller bearing A into the bore 19 under interference fit.

Also, in the needle roller bearing A of the above described construction according to the present invention, the axially opposite tabs 24 of the first opening in the outer race 21 are depressed radially inwardly of the outer race 21, and the opposite ends 27b of the roller retainer 27 are so formed and so shaped as to define an inner race guide system with their diameter smaller than that of the radially outwardly protruding intermediate portion 27a thereof as hereinabove described. Accordingly, even though the amount of radially inward depression of each of the axially opposite tabs 24 is relatively small, circumferentially opposite side edges 28a of the second opening 28 on the radially outwardly protruding intermediate portion 27a of the roller retainer 27 are brought into abutment with the axially opposite tabs 24 of the first opening 23 in the outer race 21 as shown by the double-dotted chain line in FIG. 1, thereby restricting the angular movement of the roller retainer 27 within the outer race 21 about the longitudinal axis of the needle roller bearing A. Because of this design, no positioning procedure for aligning the second opening 28 in the roller retainer 27 with the first opening 23 in the outer race need be practiced. Thus, the present invention dispenses with the need to carry out the complicated and time-consuming positioning procedure for the roller retainer, which has hitherto been required in mounting the prior art needle roller bearing, making it possible to increase the workability in installing the needle roller bearing A.

Furthermore, the roller retainer 27 employed in the practice of the present invention is in the form of a tubular member formed with the second opening 28 and with no longitudinal split such as employed in the roller retainer of the prior art needle roller bearing, and therefore, the roller retainer 27 in the needle roller bearing A of the present invention has a physical strength and a durability both superior to those of the roller retainer in the prior art needle roller bearing.

Yet, since the roller retainer 27 employed in the needle roller bearing A of the present invention is greater in diameter at the radially outwardly protruding intermediate portion 27b thereof than at the opposite ends 27a thereof, even though the roller retainer 27 is in the form of the tubular member with no longitudinal split, the presence of the axially opposite tabs 24 of the first opening 23 in the outer race 21 does not constitute any obstacle to the axial insertion of the roller retainer 27 into the outer race 21 during the assemblage and mounting of the needle roller bearing A.

In other words, it may be contemplated that, as shown in FIG. 9, the roller retainer now identified by 50, may be in the form of a tubular member having a circumferentially continuous wall formed with a plurality of pockets 52 and an opening 51 defined therein at a location corresponding to the position of the longitudinal split in the roller retainer employed in the prior art needle roller bearing. In this design shown in FIG. 9, as is generally considered customary in a needle roller bearing of the type that does not employ the inner race, axially opposite ends 50a of the roller retainer 50 are held in close proximity to the inner peripheral surface of an outer race 53 thereby to provide a so-called 'outer race guide model'. Since the roller retainer 50 shown in FIG. 9 is of one-piece construction and is unable to be deformed radially inwardly to allow it to fit into a bore of the outer race 53 during the insertion of the roller retainer 50 into the outer race 53, the opposite ends 50a of the roller retainer 50 will interfere with radially inwardly depressed tabs 54 in the outer race 53, making it difficult to insert the roller retainer 50 into the outer race 53. Even though the roller retainer 50 may be successfully inserted into the outer race 53, an angular positioning of the roller retainer 50 with respect to the circumferential direction about the longitudinal axis of the roller retainer 50 cannot be fixed since an axially intermediate portion of the roller retainer 50 is in no way brought into abutment with the axially opposite tabs 54 in the outer race 53.

In contrast thereto, according to the first preferred embodiment of the present invention, and as best shown in FIG. 2, since the roller retainer 27 is of the so-called 'inner race guide model' in which the opposite ends 27b of the roller retainer 27 are held in close proximity to the shaft 13, the opposite ends 27b of the roller retainer 27 are considerably spaced radially inwardly from the inner peripheral surface of the outer race 21 when the needle roller bearing A is in a completely assembled condition and, therefore, during the insertion of the roller retainer 27 into the outer race 21, the opposite ends 27b of the roller retainer 27 in no way contact any one of the radially inwardly depressed, axially opposite tabs 24 in the outer race 21, thereby facilitating the easy insertion of the roller retainer 27 into the outer race 21 during the assemblage of the needle roller bearing A of the present invention.

In the needle roller bearing A according to the embodiment of the present invention shown in and described with reference to FIGS. 1 to 8, since each of the radially inwardly depressed, axially opposite tabs 24 in the first opening 23 in the outer race 21 is, as best shown in FIG. 3A, of a generally crescent shape having a respective free edge delimited by the chord of the imaginary circle occupied by the first opening 23 and is in the form of a flat plate inclined generally radially inwardly of the outer race 21, the axially opposite tabs 24 can readily be formed by means of a press work using a punch and dies which are simple in shape.

The first opening 23 in the outer race 21 is of a generally round shape with its circumferentially spaced, axially opposite portions occupied by the generally crescent-shaped tabs 24 as hereinbefore described. Therefore, the actual open surface area of the first opening 23 is smaller than that occupied by a generally rectangular shape of the opening. In other words, while an engagement member 15 is generally of a circular cross-section and, as shown in FIG. 1, is inserted in the through-hole 17 in the housing 12 so as to extend through the first opening 23 in the outer race 21 and then through the second opening 28 in the roller retainer 27 for engagement with the shaft 13 so that the engagement member 15 operates together with the rotation of the shaft 13. At this time, the rotation of the shaft 13 is accompanied by a rocking motion of the engagement member 15 in a direction B circumferentially of the outer race 21. Therefore, as best shown in FIG. 3B, a clearance E is formed between each of the arcuate edges 23b of the first opening 23 and the outer perimeter of the engagement member 15.

Figure 3B:
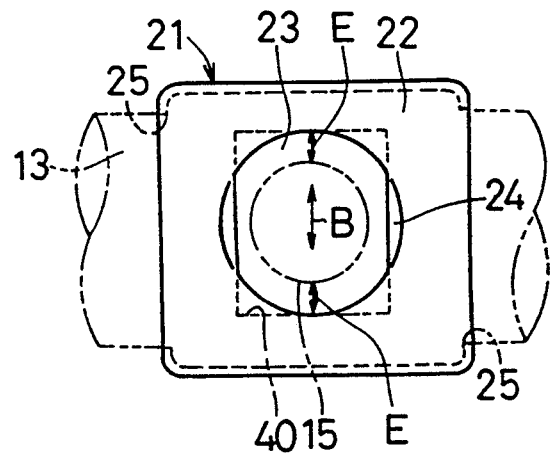
FIG. 3B is a side view of the outer race employed in the needle roller bearing shown in FIG. 1.

If, however, the rectangular opening, functionally corresponding to the first opening 23, is formed in the outer race 21 in a size sufficient to provide the clearance E on respective sides of the engagement member 15 in the circumferential direction B, such rectangular opening would occupy a surface area as shown by the phantom line in FIG. 3B which is larger than that of the actually formed first opening 23. Thus, the first opening 23 requires a smaller surface area than that of the rectangular opening and, therefore, any possible reduction in physical strength of the outer race 21 which would occur as a result of formation of the opening can advantageously be minimized correspondingly.

In describing the foregoing first preferred embodiment of the present invention, the axially opposite, generally crescent-shaped tabs 24 in the first opening 23 in the outer race 21 have been described as formed by the press work using the punch and die so as to be inclined generally radially inwardly of the outer race 21. It has, however, been found difficult to form the axially opposite tabs 24 precisely and accurately and a variation in bending depth often occurs from one outer race to another.

Figure 10:
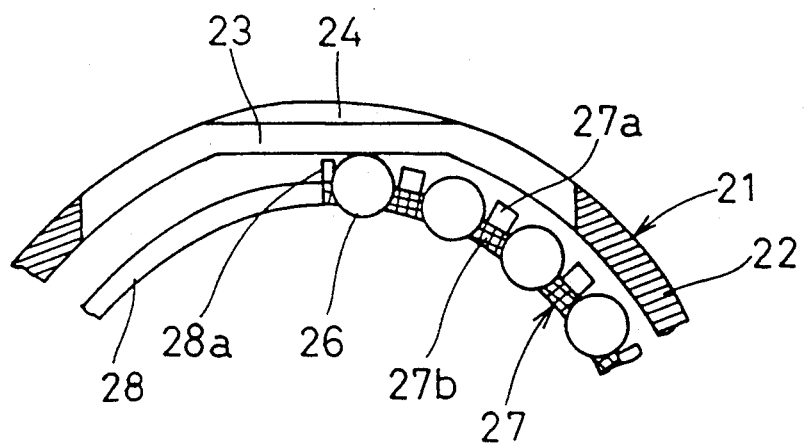
FIG. 10 is a fragmentary transverse sectional view, on an enlarged scale, of a portion of the needle roller bearing showing a unique operation thereof.

If the bending depth is considerably small, the axially opposite side edges 28a in the roller retainer 27 will not be engaged with the axially opposite tabs 24 in the first opening 23 in the outer race 21 in a manner as shown by the double-dotted chain line in FIG. 1 and, rather as shown on an enlarged scale in FIG. 10, the one of the axially opposite side edges 28a in the roller retainer 27 may creep in beneath the axially opposite tabs 24 with one of the needle rollers 26 consequently interfering with such axially opposite tabs 24. Once this interference occurs between the needle roller 26 and the axially opposite tabs 24, it may occur that such needle roller 26 will be wedged deep into gaps defined between the outer peripheral surface of the shaft 13 and each of the axially opposite tabs 24, with the roller retainer 27 consequently locked in position.

Figure 12:
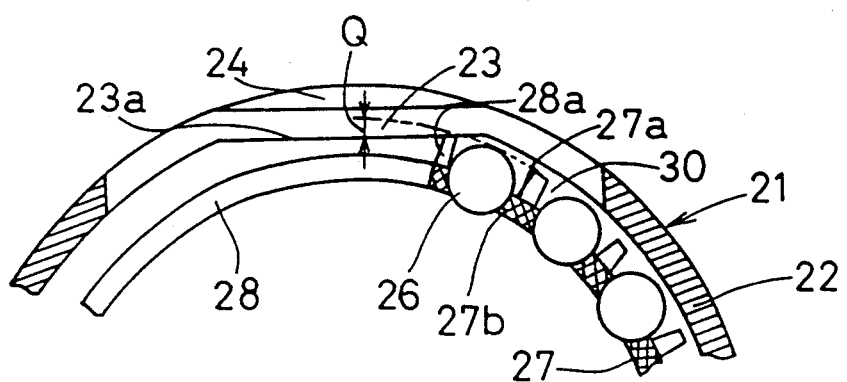
FIG. 12 is a fragmentary transverse sectional view, on an enlarged scale, of a portion of the needle roller bearing shown in FIG. 11.
Figure 11:
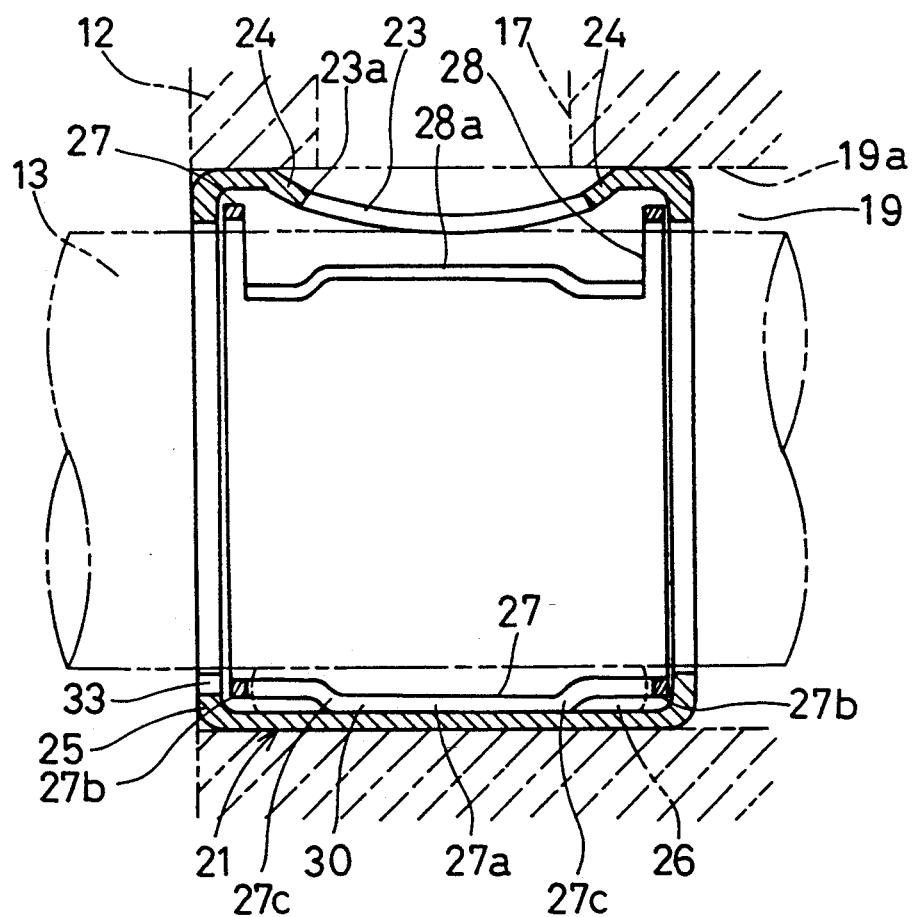
FIG. 11 is a longitudinal sectional view of the needle roller bearing according to a second preferred embodiment of the present invention.
Figure 13:
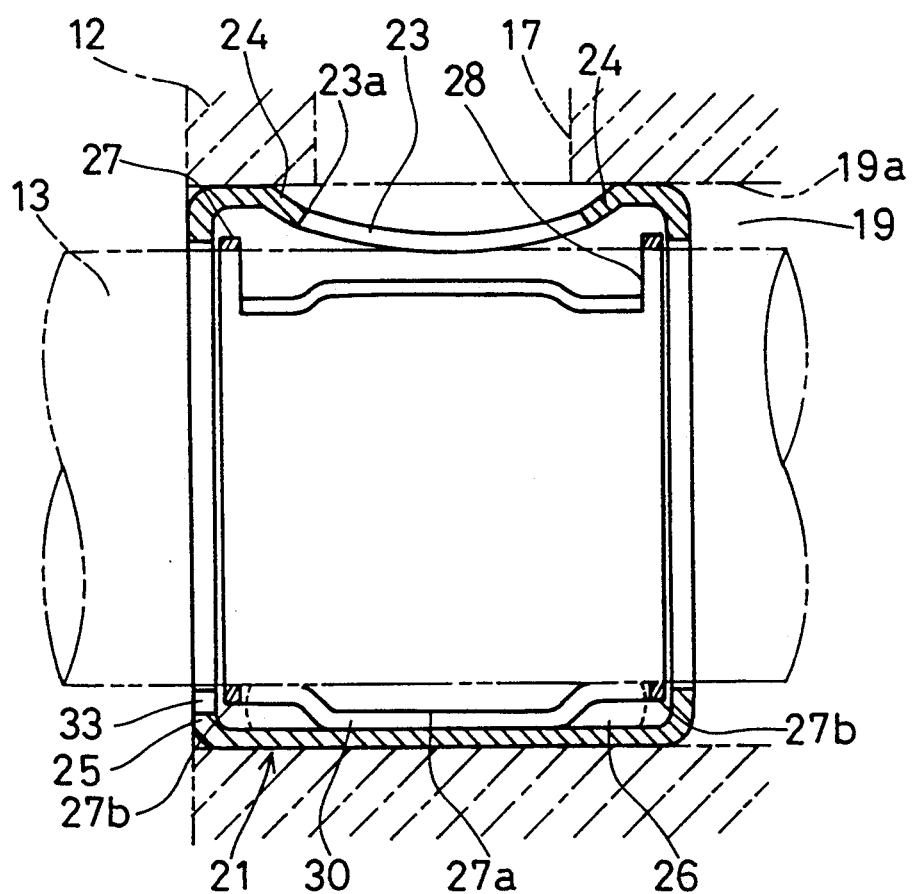
FIG. 13 is a longitudinal sectional view of the needle roller bearing according to a third preferred embodiment of the present invention.

The above discussed problem can advantageously be alleviated according to any one of the second and third preferred embodiments of the present invention shown in FIGS. 11 and 12 and FIG. 13, respectively.

According to the second preferred embodiment of the present invention as best shown in FIG. 11, the roller retainer 27 is in the form of a tubular member having no longitudinal split and includes the tubular wall 22 formed with the second opening 28 at a location aligned with the first opening 23 in the outer race 21, as is the case with the roller retainer employed in the foregoing embodiment of the present invention. Also, the roller retainer 27 employed therein has an outer diameter greater at the axially intermediate portion 27a thereof than the outer diameter of any one of the opposite ends 27b thereof with the axially intermediate portion 27a radially outwardly protruding from a cylinder occupied by the opposite ends 27b a radial distance sufficient to permit a slight annular gap to be defined between the outer peripheral surface of the axially intermediate portion 27a and the inner peripheral surface of the outer race 21, whereby the outer peripheral surface of the axially intermediate portion 27a of the roller retainer 27 forms a so-called 'outer diameter guide system' in which that outer peripheral surface of the axially intermediate portion 27a serves as a guided face that is guided by the outer race 21. It is to be noted that the outer race 21 is of a shape identical with that shown in FIG. 3A.

As indicated above the radially outwardly protruding intermediate portion 27a of the roller retainer 27 has a great diameter so as to protrude a substantial distance radially outwardly from the longitudinal axis of any one of the needle rollers 26. This may imply that restriction of the position of the needle rollers 26 with respect to the circumferential direction of the outer race 21 may be hard to achieve. However, in practice, the position of the needle rollers 26 in the circumferential direction of the outer race 21 can be sufficiently restricted since annular transit areas 27c each between the radially outwardly protruding intermediate portion 27a and one of the opposite ends 27b of the roller retainer 27 are positioned on a cylindrical surface including the longitudinal axis of any one of the needle roller 26.

With the design shown in FIG. 11, since, as is the case with the foregoing embodiment of the present invention, the axially opposite tabs 24 of the first opening 23 in the outer race protrude generally radially inwardly, and since the radially outwardly protruding intermediate portion 27a of the roller retainer 27 is of a relatively large diameter, the axially opposite side edges 28a of the second opening 28 in the roller retainer 27 are, as shown in FIG. 12, brought into contact with the axially opposite tabs 24 in the outer race 21, thereby restricting the angular movement of the roller retainer 27 within the outer race 21 about the longitudinal axis of the needle roller bearing A. Because of this design, no positioning procedure in the circumferential direction for aligning the second opening 28 in the roller retainer 27 with the first opening 23 in the outer race 21 need be practiced.

According to the second preferred embodiment of the present invention, the roller retainer 27 is of a so-called 'outer diameter guide system' wherein the annular gap between the outer peripheral surface of the radially outwardly protruding intermediate portion 27a and the inner peripheral surface of the outer race 21 is minimized, and therefore, an amount of radial interference (overlap length) Q between the axially opposite tabs 24 of the first opening 23 in the outer race and the roller retainer 27 increases. Because of this, even though the bending depth of any one of the axially opposite tabs 24 is small as a result of a variation in accuracy of bending of the axially opposite tabs 24, the roller retainer 27 can be assuredly engaged with the axially opposite tabs 24, thereby to restrict the angular movement of the roller retainer 27 inside the outer race 21. Accordingly, the possibility of the roller retainer 27 being looked as a result of a wedging of the needle roller 26 underneath one of the axially opposite tabs 24 can advantageously be avoided.

Also, even in the second preferred embodiment of the present invention, the roller retainer 27 is in the form of a tubular member having a circumferentially continued wall and, therefore, the roller retainer 27 has a physical strength and a durability both superior to those of the prior art roller retainer having a longitudinal split. Moreover, since the roller retainer 27 has the axially spaced opposite ends 27a each having a relatively small diameter as is the case with that in the foregoing embodiment of the present invention, the presence of the axially opposite tabs 24 of the first opening 23 in the outer race 21 does not constitute any obstacle to the axial insertion of the roller retainer 27 into the outer race 21 during the assemblage and mounting of the needle roller bearing A in spite of the roller retainer 27 in the form of the tubular member.

While in the second preferred embodiment of the present invention the roller retainer 27 is so designed as to be guided by only the inner peripheral surface of the outer race 21, the opposite ends 27b of the roller retainer 27 may be so sized as to be held in close proximity to the outer peripheral surface of the shaft 13 so that the roller retainer 27 can be guided by both of the outer and inner peripheral surfaces thereof as shown in FIG. 13. In the third preferred embodiment of the present invention shown in FIG. 13, the roller retainer 27 is guided by both of the shaft 13 and the outer race 21 and, therefore, the roller retainer 27 can be guided assuredly in a stable posture.

In any one of the foregoing preferred embodiments of the present invention, the first opening 23 in the outer race 21 has been shown and described as being of a shape generally similar to the circle having an axially opposite portion cut away, the first, opening 23 in the outer race 21 may be of any suitable shape and each of the axially opposite tabs 24 may also be of any suitable shape other than the crescent shape provided that the tabs 24 are radially inwardly bent so as to converge at a location inside the outer race 21.

Figure 14:
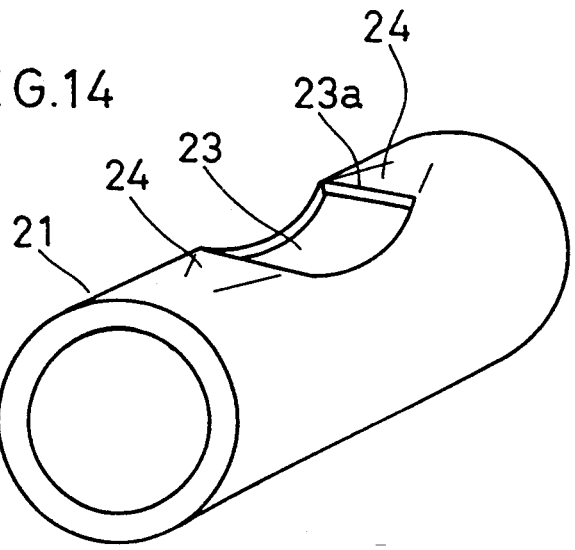
FIG. 14 is a perspective view showing a modified form of the outer race used in the needle roller bearing of the present invention.

By way of example, as shown in FIG. 14, tile first opening 23 in the outer race 21 may be of a generally rectangular shape and each of the radially inwardly protruding tabs 24 may be of a generally triangular shape.

Figure 15:
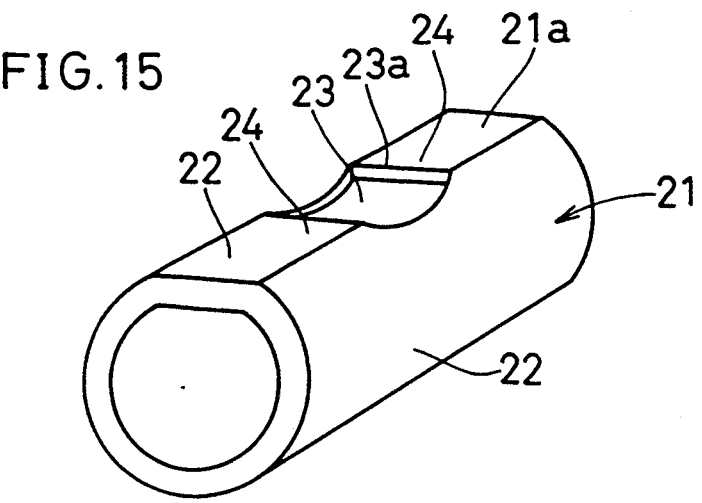
FIG. 15 is a perspective view showing a further modified form of the outer race used in the needle roller bearing of the present invention.

Alternatively, as shown in FIG. 15, a longitudinal portion of the outer peripheral surface of the outer race 21 may be flattened at 21a, followed by the formation of both of the first opening 23 and the axially opposite tabs 24 in that longitudinal portion 21a of the outer race 21. In this case, the axially opposite tabs 24 are offset radially inwardly of the outer race 21, and therefore, not only can any possible grinding of the circumferential surface 19a of the bore 19 during the insertion of the outer race 21 be avoided, but the restriction of the annular movement of the roller retainer can also be achieved.

Figure 16:
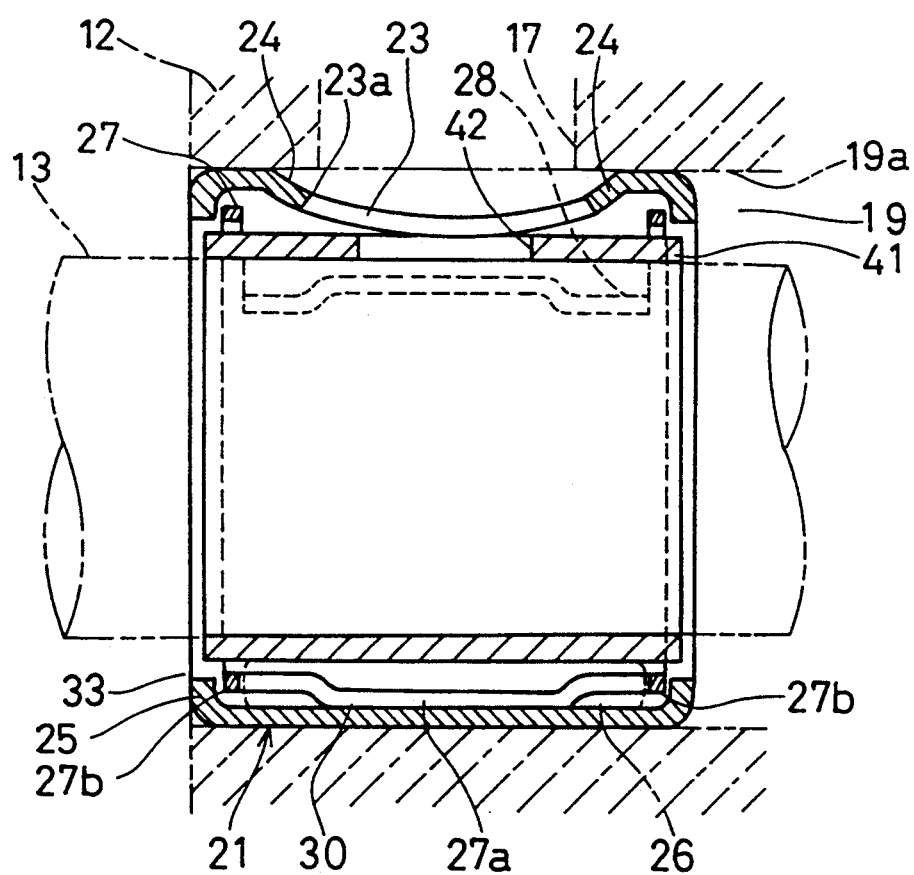
FIG. 16 is a longitudinal sectional view of the needle roller bearing according to a fourth preferred embodiment of the present invention.
Figure 17:
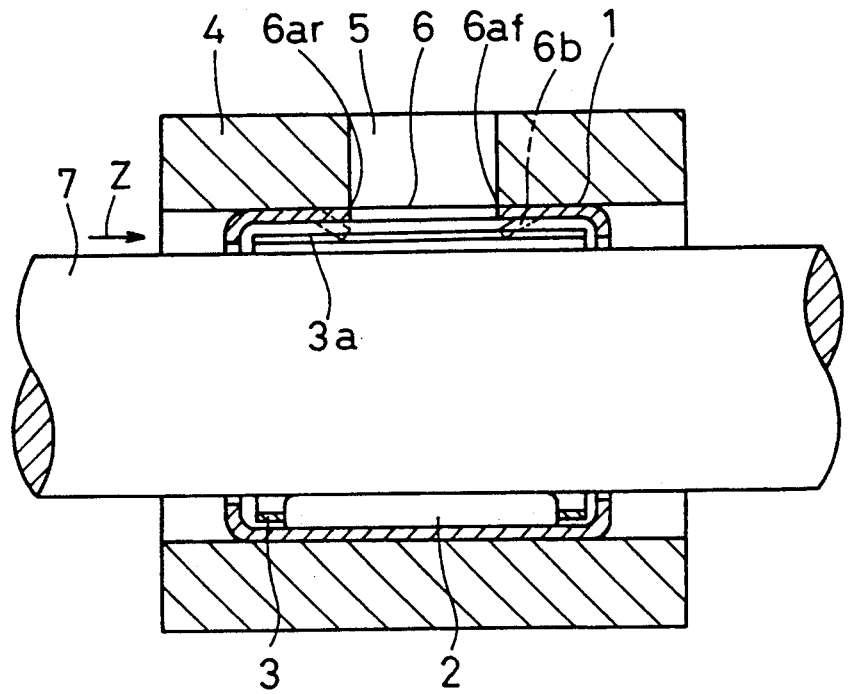
FIG. 17 is a longitudinal sectional view of one prior art needle roller bearing interposed between a housing and a shaft.
Figure 18:
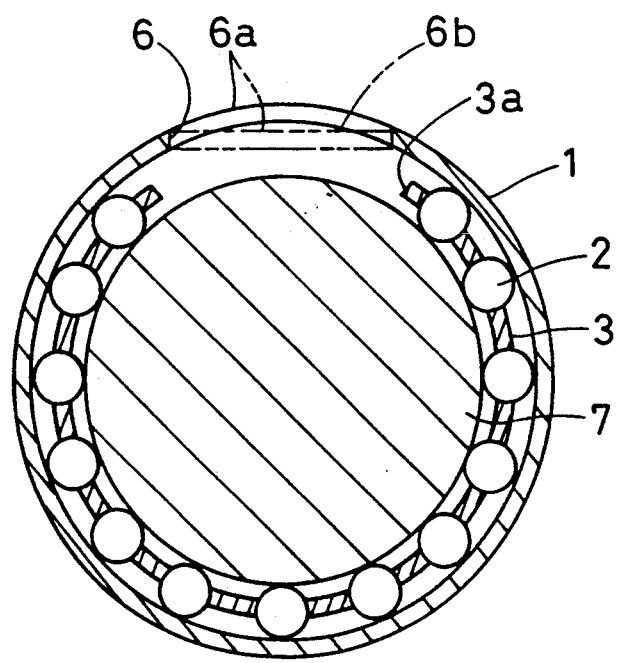
FIG. 18 is a transverse sectional view of the prior art needle roller bearing shown in FIG. 17.

Although the needle roller bearing A according to any one of the various preferred embodiments of the present invention is of the type that does not employ any inner race, the present invention can be equally applied to a needle roller bearing of a type employing an inner race 41 as shown in FIG. 16. According to a fourth preferred embodiment of the present invention shown in FIG. 16, the inner race 41 is, in the instance shown in FIG. 16, fixedly mounted on the shaft 13 for rotation together therewith and is formed with a third opening 42 aligned with the second opening 28 in the roller retainer 27. Although the roller retainer 27 employed in the fourth embodiment of the present invention is of a so-called 'outer race guide design' wherein the radially outwardly protruding intermediate portion 27a of the roller retainer 27 is held in close proximity to the outer race 21, a so-called 'inner race guide design' may be employed wherein the opposite ends 27b of the roller retainer 27 are held in close proximity to the inner race 41 as is the case with that in the first embodiment of the present invention particularly as shown in FIG. 2. Where the opposite ends 27b of the roller retainer 27 are held in close proximity to a shaft side member such as, for example, the shaft 13 or the inner race 41 fixedly mounted on the shaft 13, the 'inner race guide design' can be obtained.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, although in any one of the first to fourth preferred embodiments of the present invention, only the axially opposite portions, or portions positioned on leading and trailing sides with respect to the direction Z of insertion of the outer race 21 into the bore 19, of the peripheral lip region of the first opening 23 have been shown and described as radially inwardly depressed to provide the tabs, the peripheral lip region of the first opening 23 may be depressed radially inwardly of the outer race 21 in its entirety.

Also, only one of the axially opposite tabs, that is, either the tab 24 (i.e., the left-hand tab 24 as viewed in FIG. 3A) that is positioned on a trailing side with respect to the direction Z of insertion of the outer race 21 or the tab 24 (i.e., the right-hand tab 24 as viewed in FIG. 3A) that is positioned on a leading side with respect to the direction Z of insertion of the outer race 21 may be displaced radially inwardly.

Accordingly, such changes and modifications are, unless they depart from the scope of the present invention as delivered from the claims annexed hereto, to be construed as included therein.

What is claimed is:

1. A needle roller bearing adapted to be interposed between a housing and a shaft member rotatable relative to the housing, said needle roller bearing comprising:
  an outer race adapted to be inserted axially in a bore defined in the housing and having an opening defined in a peripheral wall thereof;
  a plurality of needle rollers juxtaposed circumferentially and inside the outer race and held in rolling contact with an inner peripheral surface of the outer race; and a roller retainer having pockets defined therein for accommodating therein the respective needle rollers;

wherein said roller retainer being in the form of a tubular member having a circumferentially continuous wall and having an opening defined in the circumferentially continuous wall of the roller retainer in alignment with the opening in the outer race; and at least one of portions of a peripheral lip region of the opening in the outer race, which portions are oppositely spaced from each other in a direction parallel to the longitudinal sense of the outer race, is formed with a tab which is offset radially inwardly from the remaining peripheral wall of the outer race thereby to restrict the position of the roller retainer with respect to the direction of angular movement thereof inside the outer race in a direction circumferentially of the outer race by interference with the peripheral lip region of the opening in the roller retainer.

2. The needle roller bearing as claimed in claim 1, wherein portions of a peripheral lip region of the opening which are opposite to each other with respect to an axial direction of the outer race are formed with the respective tabs.

3. The needle roller bearing as claimed in claim 1, wherein axially spaced opposite ends of the roller retainer have respective inner peripheral surfaces held in close proximity to a shaft side member comprised of the shaft or an inner race fixedly mounted on the shaft thereby to form guided faces adapted to be guided by the shaft side member, said roller retainer having a substantially intermediate portion protruding radially outwardly so as to have a diameter greater than that of any one of the opposite ends of the roller retainer.

4. The needle roller bearing as claimed in claim 3, wherein the roller retainer has a substantially intermediate portion having an outer diameter greater than the outer diameter of any one of the opposite ends thereof, and wherein an outer peripheral surface of the intermediate portion of the roller retainer is held in close proximity to the outer race thereby to form a guided face adapted to be guided by the outer race.

5. The needle roller bearing as claimed in claim 3, wherein an annular transit area between the intermediate portion and any one of the axially opposite ends of the roller retainer is set to restrict an angular movement of the needle rollers in a direction circumferentially thereof.

6. The needle roller bearing as claimed in claim 3, wherein inner peripheral surfaces of the axially opposite ends of the roller retainer are held in close proximity to a shaft side member comprised of the shaft or an inner race fixedly mounted on the shaft, thereby to form guided faces adapted to be guided by the shaft side member.

7. The needle roller bearing as claimed in claim 1, wherein the needle rollers are held in rolling contact with an outer peripheral surface of the shaft.

8. The needle roller bearing as claimed in claim 1, wherein said opening in the outer race is of a shape delimited by an arc of the circle and a chord of the same circle while leaving a generally crescent-shaped portion on the circle, said tab being constituted by the crescent-shaped portion.

9. The needle roller bearing as claimed in claim 8, wherein said tab is radially inwardly bent so as to incline downwardly towards the interior of the outer race.

10. The needle roller bearing as claimed in claim 8, wherein a longitudinal portion of an outer peripheral surface of the outer race including the opening is flattened over the entire length thereof.

11. The needle roller bearing as claimed in claim 1, wherein said roller retainer is made of a plate member.

* * * * *

UNITED STATES PATENT AND TRADEMARK OFFICE
CERTIFICATE OF CORRECTION

PATENT NO. : 5,324,119
DATED : June 28, 1994
INVENTOR(S) : Kazuyoshi HARIMOTO and Atsushi YAMASHITA It is certified that error appears in the above-indentified patent and that said Letters Patent is hereby corrected as shown below:

On the Title Page, under the Heading, [30] Foreign Application Priority Data, change "Mar. 29, 1993 [JP]  Japan ........ 5-095530" to -- Mar. 29, 1993 [JP]  Japan ........ 5-095533 --

Signed and Sealed this

Sixth Day of September, 1994

Attest:

BRUCE LEHMAN

*Attesting Officer*  *Commissioner of Patents and Trademarks*